(12) United States Patent
Darcissac et al.

(10) Patent No.: US 6,294,498 B1
(45) Date of Patent: Sep. 25, 2001

US006294498B1

(54) PROTECTION OF CATALYSTS BY DEPOSITION OF A PROTECTIVE LAYER

(75) Inventors: Joan Darcissac, Les Bains; Franck Labruyere, Lyons; Nilanjan Brahma, La Voulte sur Rhone; Pierre Dufrense, Valance, all of (FR)

(73) Assignee: Europeenne de Retraitement de Catalyseurs Eurecat, La Voulte sur Rhone (FR)

( * ) Notice: Subject to any disclaimer, the term of this patent is extended or adjusted under 35 U.S.C. 154(b) by 0 days.

(21) Appl. No.: 09/132,517

(22) Filed: Aug. 11, 1998

Related U.S. Application Data

(60) Provisional application No. 60/061,459, filed on Oct. 9, 1997.

(30) Foreign Application Priority Data

Aug. 11, 1997 (FR) .................................................. 97 10361

(51) Int. Cl.⁷ ................................ B01J 31/06; B01J 20/26
(52) U.S. Cl. .................... 502/159; 502/402; 502/527.12; 502/527.13; 502/527.15
(58) Field of Search ..................................... 502/159, 402, 502/527.12, 527.13, 527.15

(56) References Cited

U.S. PATENT DOCUMENTS

| | | | |
|---|---|---|---|
| 2,842,504 | * 7/1958 | Jones ..................................... | 502/159 |
| 3,453,217 | * 7/1969 | Kozlowski et al. ................. | 502/159 |
| 4,073,748 | 2/1978 | Brown et al. . | |
| 4,808,562 | * 2/1989 | Kubersky et al. .................... | 502/172 |
| 4,900,713 | 2/1990 | Brent, Jr., et al. .................... | 502/439 |
| 5,268,097 | * 12/1993 | Girot et al. .......................... | 502/402 |
| 5,445,732 | * 8/1995 | Girot et al. .......................... | 502/402 |
| 5,906,734 | * 5/1999 | Girot et al. .......................... | 502/402 |

FOREIGN PATENT DOCUMENTS

| | | |
|---|---|---|
| 0 020 123 | 12/1980 | (EP) . |
| 0 311 508 | 4/1989 | (EP) . |
| 94/25157 | 11/1994 | (WO) . |

\* cited by examiner

*Primary Examiner*—Elizabeth D. Wood
(74) *Attorney, Agent, or Firm*—Millen, White, Zelano & Branigan, P.C.

(57) ABSTRACT

Process for passivation of a heterogenous catalyst of refining reactions or hydrocarbon hydroconversion reactions, characterized in that the external surface of the particles of said heterogeneous catalyst is coated with a protective layer that is made of a particularly inert material which can be eliminated in the reaction zone under the conditions of the reaction.

21 Claims, No Drawings

PROTECTION OF CATALYSTS BY DEPOSITION OF A PROTECTIVE LAYER

CROSS REFERENCE TO RELATED APPLICATIONS

This application claims priority under 35 U.S.C. 119(e) of Provisional Application 60/061,459 filed Oct. 9, 1997.

BACKGROUND OF THE INVENTION

Heterogeneous catalysts often consist of an active phase that is unstable in air. This is true of, for example, hydrotreatment catalysts (or refining reactions or hydrocarbon hydroconversion reactions) that contain the metal combinations CoMo, NiMo, NiW on an alumina and/or alumina-silica substrate, whereby said combinations contain an active phase such as metal sulfide. Another example consists of hydrogenation catalysts or steam-reforming catalysts with a nickel base that contain 10 to 70% by weight of Ni. These same solids are also used as sulfur traps. After the oxide NiO in the metal is reduced, the solid is air-sensitive and even pyrophoric. This is also true of systems with a copper base, such as copper-chromium for hydrogenation and copper-zinc for the conversion reaction of carbon monoxide (water gas shift) in the hydrogen units. There are also catalysts with an iron base in these same units (iron-chromium) or for the synthesis of ammonias that are used after reducing activation. In another category, there are catalysts for isomerizing n-butane or light naphtha with a platinum and strongly chlorinated alumina base of which the active phase, which is related to aluminum chloride, is highly sensitive to the ambient atmosphere (oxygen and water).

The practices developed by the industry take this constraint into account.

Thus, for hydrotreatment catalysts of the CoMo, NiMo, and NiW type on the preferably amorphous substrate, the active phase is produced only after the catalyst is loaded into the reactor itself, under pressure from hydrogen and a sulfurated compound. At the end of the cycle, the catalyst is removed from the reactor and brought into contact with the air without violent reactions occurring since the active phase is coated with compounds that contain carbon and limit contact with oxygen. Nevertheless, these catalysts may heat up somewhat during aeration, owing to oxidation of the sulfide phases, and certain specialists have tried to solve these problems. For example, the addition of polyaromatic compounds, Patent U.S. Pat. No. 4,912,071 by KASHIMA and CHIYODA, Japan will be cited; the addition of compounds such as amines, patents by Nippon Mining Company filed in 1977 exclusively in Japan.

For catalysts with a transition metal base, such as nickel, copper, or iron, the stage for reduction under hydrogen is also generally carried out in the unit. In some cases, the reduction is performed "off site" in a reactor that is separate from the reaction system, and the catalyst should then be passivated to avoid any risk of heating during transport, storage of the catalyst, and loading of the reactor. This passivation can be carried out in three different ways.

The most common is surface oxidation wish air that is diluted with an inert gas. This is carried out by raising, very slowly, the partial pressure of oxygen to limit the rise in temperature. This procedure makes it possible to create a surface layer of metal oxide that protects the reduced metal and thus makes it possible to handle the solid in air. The drawback is that it is again necessary to eliminate this oxide layer in the catalytic reactor, in general when hot. For example, if a catalyst with a nickel base when fresh is to be reduced at around 400° C. in the unit, a catalyst that is reduced off-site and passivated by surface reoxidation should again be reduced in the unit at a temperature of 200–250° C. This requires that there be suitable furnaces upstream from the reactor. Another drawback is the generation of $H_2O$ corresponding to the elimination of the oxygen that is provided during the reoxidation stage. Another technique that is related to the latter is reoxidation/passivation by carbon dioxide. Finally, it is also possible to wet the catalyst with a liquid that prevents the oxygen from diffusing into the catalyst grain. The difficulty is then to load the reactor with a solid/liquid mixture or at best a wet solid and one whose grains stick together.

In the case of isomerizing catalysts with a chlorinated alumina base, there is no available passivation technique that can be reversible since $O_2$ or $H_2O$ irreversibly alter the active sites. The techniques that are employed are then to use very tight packaging for transport, such as, for example, metal drums with tight covers and systems for loading under inert gas that make it possible to limit contact between the solid and traces of air or moisture.

SUMMARY OF THE INVENTION

The object of the invention is to achieve passivation of the particles of the solid by coating the external surface with at least one protective layer of a material that is particularly inert and can be eliminated in the reactor under the conditions of the reaction. The core of the solid, its internal pores, is thus protected from the outside atmosphere by this barrier which prevents or limits the diffusion of oxygen. The original feature of the invention resides particularly in the fact that it is a coating of a granulated solid and not an impregnation of all the pores of the solid. Coating is defined as either a uniform layer of well-defined thickness or a layer whose concentration decreases from the periphery toward the inside of the catalyst membrane, i.e., a layer whose thickness varies according to a gradient. Thus, the concentration of the coating then decreases from the periphery to the center of the grain. The coating is preferably carried out on the outside surface of the particle, and the concentration of the coating material decreases from the periphery to the center without it being necessary for material to be at the center. The gradient, therefore, decreases and then gradually disappears as it approaches the center.

Patent Application EP 311 508 describes the deposition of a protective film by spraying paraffin, followed by cooling.

Patent Application WO 94/25157 describes a protective material that comprises an oxidized hydrocarbon that is brought into contact with the catalyst at a temperature that is greater than the melting point of the catalyst.

The impregnation technique is mentioned in, for example, U.S. patent application Ser. No. 95-398860 of Mar. 6, 1996 from CHEM RES & LICENSING, which mentions wetting with paraffin (wax) followed by cooling. Patent U.S. Pat. No. 3,453,217 from CHEVRON claims impregnation with a high-boiling hydrocarbon. Impregnation of all pores with a compound that contains hydrocarbon is a process that makes it possible actually to isolate the active phase from the external atmosphere, but it has the drawback of requiring a large quantity of protective material. With the pore volumes of the usual catalysts being relatively high, 20 to 80 ml per 100 g and most often 30 to 60 ml, filling of the pores will therefore generally require more than 30% by weight of compound that contains hydrocarbon relative to the weight of the solid. This poses various problems: high cost, high grain density which may give rise to problems during the loading of the catalyst in the reactor, and possible problems in evacuating this compound during the start-up of the unit.

Coating or encapsulation according to the invention consists in filling the pore volume not of all the grains but simply preferably of the external -ring or of a gradient of the grain, with the object being to deposit a quantity of protective agent that is equivalent, preferably, to less than approximately half corresponding to the filling of the pore volume or, for example, less than 30%, and if possible less than 25% by weight relative to the solid (catalyst).

Effectiveness will obviously also depend on the oxygen permeability (and in some cases the water permeability) of the material, with the products being more or less high-performing as a barrier material. The least permeable products can make it possible to produce finer protective layers.

The compounds that are suitable for the production of a protective layer are of various types, and also depend on the encapsulation technique.

It is possible first to coat the particles of the catalyst (grain, ball, extrudate or any other powder form of solid) with, for example, a liquid by keeping the catalyst at a temperature that is below the crystallization (or melting) or solidification point of the protective compound. Thus, a paraffin with a melting point of 60° C. can be atomized on a solid (catalyst) at 30° C. and form a protective ring (or any equivalent shape) by crystallization upon contact with the cold solid (for example, ambient temperature).

Polyethylene wax with a melting point of 110° C. can be deposited by atomization on the solid (catalyst) at a temperature of 50 to 80° C. The products that can be used within this framework are compounds that contain hydrocarbons of petroleum, synthetic hydrocarbons, or even natural products. This means paraffins or waxes or heavy petroleum hydrocarbons, light polymers such as polyethylene waxes, polypropylene waxes, and polystyrene waxes. Other polymers that have a molecular weight that is low enough to have a viscosity under high-temperature conditions of below 5000 centipoise (500 pascal seconds) (without adding solvent) can be used. All the existing polymers can be suitable if their degree of crosslinking is limited.

It is also possible to use a heavy hydrocarbon, for example, a distillate under vacuum or an oil base. This product can advantageously be atomized under hot conditions to reduce its viscosity, on a cold solid. The temperature of the solid will not be such as when the product crystallizes, as occurs in the preceding cases, but such that the viscosity of the liquid in the pores becomes strong and slows the transport to the core of the grain to achieve a coating effect effectively.

Another possibility, which can be adapted to any material cited above, is to use a coating agent that is diluted or in suspension in a solvent and to apply by atomization, spraying, or dispersion the solution/suspension at a temperature that is greater than the boiling point of the solvent. Thus, the solvent is quickly eliminated by vaporization upon contact with the catalyst, and the solute that is solidified in a ring (or any other equivalent shape) around or in the grain, thus creating the protective layer.

Another possibility is to use a protective agent that consists of a group of molecules with high molecular weight in solution/suspension in a solvent. The size of the molecules will be selected such that their diffusion into the core of the pores of the solid is delayed or prevented (ring or gradient, for example). Thus, in a catalyst with a mean micropore diameter of around 10 nanometers, as is often the case with hydrotreatment catalysts for conventional petroleum fractions, a molecule diameter of more than 10 or 20 nm, for example 100 nm, which is the case of many polymers in solution/suspension that are available on the market, can be selected. All the resins that are used for making paints and varnishes can be suitable either in solution/suspension in water or organic solvents. For example, styrenic glycerophthallic resins, acrylic esters, polyvinyl acetate, etc. or copolymers can be used. In this case, the protective layer consists of a continuous film with a thickness of, for example, several microns.

Among the polymeric compounds whose impermeability to oxygen is high, there are, for example, the following: polyvinylidene chloride, ethylene-vinyl alcohol copolymer, polyamide, polyvinyl alcohol, polyacrylonitrile or polystyrene-acrylonitrile copolymers, naphthalate or terephthalate polyethylene, epoxy resins, acrylic resins, and cellophane. Some polymers are also remarkable for their watertightness, such as polyvinylidene chloride, and polychlorotrifluoroethylene. Other materials can represent a good economical compromise, such as polyethylene, polypropylene, polyvinyl chloride, etc . . .

In view of the various methods for applying coating agent, the suitable type of compound can vary a great deal, with the only constraint being that the protective layer can be basically removed under conditions of use of the catalyst. This compound is preferably organic and contains carbon atoms and hydrogen atoms with optionally oxygen heteroatoms, nitrogen heteroatoms, sulfur heteroatoms, i.e., for example, of the alcohol groups, aldehydes, ketones, acids, esters, amines, amides, mercaptan (thiols), sulfides, and sulfones.

The protective layer will be eliminated,under the conditions of catalyst use according to various mechanisms. This is done either by, for example, dissolution with reaction medium or with a specific solvent that is used for this purpose. Thus, by hydrotreatment of atmospheric gas oil or by isomerizing light naphtha, these two load types will easily dissolve, for example, a layer of paraffin and thus provide access to the active sites of the catalyst. The product can also be destroyed by reaction under the conditions of catalyst use without pressure of hydrogen, and when hot, C—S, C—O, C—N and C—C bonds can be partially destroyed by hydrogenolysis or hydrocracking, thus making the destruction of the protective layer possible.

This coating technique makes it possible to improve several properties of the catalysts in granules, balls, or pellets:

Elimination or reduction of the self-heating effect with air, which improves the transport conditions for the product. This property is evaluated by the ONU self-heating tests.

Improvement of the mechanical resistance of the grains: formation of fines reduced during loading, pressurization, and contacting with oil. These properties are evaluated by measuring the "attrition in a barrel" and "crushing in a bed" or "bulk crushing strength."

Improvement of the tribological properties of the grains: the grains which have small friction resistances that slip most easily over one another, which allows easier loading, reduction of potential dead zones with low loading density, and therefore preferred passage of the load (channeling). This property is evaluated by a flow rate of the solid through a funnel.

These last two improvements apply as well to a fresh catalyst that is not presulfurated, prereduced, or pretreated, i.e., one that is self-heating only on a catalyst that is likely to be self-heating.

In an implementation of the process of the invention, a step of bleeding of the catalyst is performed before passivation by coating. More particularly, the bleeding is performed by respecting the fact that the temperature is, for example, less than about 50° C.

This invention also relates to the passivated catalysts that are obtained by the process of this invention, as well as their use in hydrocarbon conversion processes (particularly hydrotreatment)

EXAMPLE 1 (Not according to the invention)

A commercial hydrotreatment catalyst that contains 20% by weight of $MoO_3$ and 5% of CoO on an aluminic substrate, with a specific surface area of 210 $m^2/g$, is industrially presulfurated by a tert-nonyl polysulfide to obtain a quantity of sulfur of about 90% of the theoretic stoichiometry of $MoS_2$ and $Co_9S_8$.

The following table summarizes the physico-chemical characteristics that are obtained. Some methods are related in more detail below.

The catalyst that is obtained is subjected to a self-heating test to determine whether it belongs to class 4.2 of the self-heating materials according to the ONU standard: 15.5 cc of catalyst is placed in a mesh cube that measures 2.5 cm on one side. The mesh of the netting is 0.5 mm. At the center of the cube, a thermocouple measures the temperature. The cube is introduced into an oven at 140° C., and the core temperature is tracked over time. Self-heating in terms of the standard is positive if, at the end of 24 test hours, the core temperature exceeds 200° C.

The pore volume is defined by the maximum amount of water that is adsorbed by the catalyst with saturation of the latter (in ml of water per 100 g of catalyst).

The attrition test, a version of the ASTM D4058 standard that is made tougher by increasing the test period to three hours, measures the mechanical resistance of the grains that are subjected en masse to repeated drops in a barrel. Attrition is provided by the weight percentage of fines that are less than 0.5 mm and that are produced during the rotation of the catalyst in the rotating cylinder.

BCS (Bulk Crushina Strenath) classifies resistance to crushing by measuring a piston pressure that is exerted on a solid bed, which pressure generates 0.5% by weight of fines that are less than 0.5 mm and is expressed in megapascals.

Weight loss measures the percentage reduction of a catalyst material that is calcined in a muffle furnace at 500° C. for 4 hours.

The flow rate of the catalyst is defined from how long it takes for 3 liters of catalyst to be totally emptied through a circular orifice that is 14.6 $mm^2$ in cross-section and is expressed in liters per minute.

| Presulfurated catalyst, basic case | |
|---|---|
| Weight loss (%) | 18.3 |
| Carbon (% by weight) | 7.7 |
| Sulfur (% by weight) | 8.1 |
| Packed density (kg/$cm^3$) | 0.86 |
| Bulk Crushing Strength (Mpa) | 1.0 |
| Attrition (% by weight) | 1.4 |
| Self-heating | positive |
| Temp. maxi ONU test (° C.) | 445 |
| Pore volume (ml/100 g) | 23 |
| Flow rate (1/mn) | 1926 |

The catalyst has to be classified as self-heating in view of its behavior in the ONU test.

EXAMPLE 2

The sulfurated catalyst as obtained in Example No. 1 is introduced into a steel barrel rotating at 100 rpm. The barrel is equipped with four lifting devices that ensure permanent stirring of the catalyst during rotation and a compressed gas-spraying nozzle (spray gun type). The unit is heated to 50° C.

A 20% by weight solution of acrylic polymer-type resin in ethyl acetate is slowly sprayed on the catalyst to deposit 5 g of polymer per 100 g of catalyst over a period of one hour. The molecular size of the acrylic polymer (>100 nm) is larger than the size of the micropores of alumina (10 nm). The nozzle is adjusted such that the vector solvent is virtually completely vaporized during its travel to the catalyst grains. The polymer is thus deposited randomly on the outside surface of the catalyst grains during continuous stirring, preventing any agglomeration by adhesive bonding and thus creating a protective layer on all the faces and uneven spots of each elementary grain.

Various types of analyses and experimentation are then carried out. They are summarized in the following table and explained below.

| | Presulfurated (without coating) | Coated (finished product) | Coated lixiviated/dried | Coated/crushed |
|---|---|---|---|---|
| Weight loss (%) | 18.3 | 23.2 | 14.2 | — |
| Carbon (% by weight) | 7.7 | 10.3 | 5.0 | — |
| Sulfur (% by weight) | 8.1 | 7.5 | 7.5 | — |
| BCS (MPa) | 1.0 | 1.3 | — | — |
| Attrition (% by weight) | — | 0.5 | — | — |
| Pore volume (ml/100 g) | 23 | 5.7 | 27 | 19.5 |
| Self-heating | positive | negative | positive | — |
| Temp. maxi CNU test (° C.) | 445 | 155 | 325 | — |
| Flow rate (1/mn) | 1926 | 2022 | — | — |

Subjected to the same self-heating test as in Example 1, the coated catalyst reaches only 155° C., indicating the elimination of self-heating by outside protection (see table above). The pore volume in water is reduced to 25% of the initial value of Example 1 and indicates the development of a barrier between the outside and the core of the grain. The coated catalyst is then partially broken by crushing to reduce the mean grain length by half, thus exposing an uncoated surface. From that time on, the pore volume impregnated with water rises to 84% and proves that only the surface of the grain was protected. The low attrition (0.5% of fines at the end of 3 hours) and the BCS (1.3 MPa) demonstrate the improved mechanical resistance properties of the grain with physical constraints such as those encountered during loading of industrial reactors or during pressure surges upon start-up.

Subsequently, we wanted to verify that it was indeed the coating which induced in the product the loss of self-heating.

This coated catalyst is thus subjected to washing with hot toluene (Soxhlet technique) for 2 hours. The lixiviate obtained is oven-dried at 120° C., and it leaves an elastic film-forming residue that consists of polymer and organic residues. After drying for 3 hours in a thin layer at 120° C. in a ventilated enclosure, the catalyst is again tested for self-heating. The temperature rises to 325° C. and indicates the recovery of self-heating. The impregnation volume rises to 27 ml or 118% of the base value. Therefore, by removing the protective layer, the pore volume in water is increased, and self-heating is restored.

To confirm the concept of a protective layer, we also coarsely crushed the coated catalyst grains to shorten the mean length by half. The pore volume that is measured on these grains, i.e., exhibiting at least statistically a pseudocircular section that is devoid of a barrier polymer, rises to 19.5 ml, showing that access to the pores is partially restored by the broken, and thus uncoated, faces.

EXAMPLE 3

100 g of the initial oxide catalyst of Example 1 is sulfurated in a fixed bed in a vertical furnace at 350° C. during mixing of hydrogen/sulfurated hydrogen ($H_2/H_2S$– 85/15 volume/volume) that flows at 40 l/h under atmospheric pressure. The duration of the plateau is 1 hour, and then the catalyst is cooled to ambient temperature under nitrogen.

The sulfurated catalyst is brought into contact with air at a rate of 5 successive plateaus per hour at partial pressures of oxygen that increase in the following sequence: 0.5%, 1%, 5%, 10%, 20%, while making sure that the temperature remains on this side of 50° C.

The product is deposited in a rotating steel barrel in which a polyethylene wax with a melting point of 137° C. is atomized at 160° C. Upon contact with the cold solid, the wax solidifies at the surface of the grain pores, and the quantity of wax that is deposited corresponds to 8% by weight relative to the catalyst.

The same methodology as in the preceding examples is used, namely: analyses of the sulfurated catalyst, of the coated catalyst, then of the lixiviated coated catalyst with heptane to heptane.

|  | Sulfurated | Coated | Lixiviated/dried |
| --- | --- | --- | --- |
| Weight loss (%) | 5.1 | 12.9 | 4.1 |
| Carbon (% by weight) | 0.1 | 5.5 | 1.3 |
| Sulfur (% by weight) | 9.5 | 9.1 | 9.3 |
| BCS (MPa) | 1.1 | 1.3 | 1.1 |
| Attrition (% by weight) | 1.5 | 0.8 | 1.2 |
| Pore volume (ml/100 g) | 48 | 4.2 | 43 |
| Self-heating | positive | negative | positive |
| Temp. maxi ONU test (° C.) | 410 | 155 | 425 |

The coated solid is therefore no longer self-heating, but becomes so again if the wax is removed by lixiviation with hot heptane. The pore volume also follows the same trend, and the mechanical properties are also improved by coating.

EXAMPLE 4

A sulfurated catalyst according to Example 3, not subjected to moderated passivating oxidation with air, is sprayed, under inert atmosphere at 120° C., with a 600 Neutral type oil base (brand TOTAL, viscosity at 40° C.: 120 centipoise). The quantity of oil that is deposited represents 20% by weight of the coated solid.

After cooling to ambient temperature and being put back into air, the coated catalyst is subjected to the following treatments:

|  | Presulfurated (base) | Coated (finished product) | Coated/lixiviated/dried | Coated/crushed |
| --- | --- | --- | --- | --- |
| Weight loss (% by weight) | NA | 20.1 | 8.5 | — |
| Carbon (% by weight) | 0.3 | 15.5 | 2.4 | — |
| Sulfur (% by weight) | 9.8 | 8.7 | 9 | — |
| Pore volume (ml/100 g) | 47 | 10 | 39 | 30 |
| Self-heating | positive | negative | positive | — |
| Temp. maxi ONU Test (° C.) | NA | 160° C. | NA | — |

In line with the preceding examples, the disappearance of self-heating and partial clogging of the outside pores of the coated catalyst are noted. The coating is eliminated by solubilizing in toluene.

EXAMPLE 5 (anomalous)

The example is implemented on a commercial catalyst that contains 75% by weight of nickel oxide (NiO), which is used for hydrogenation reactions. 80 g of this product is loaded into a glass vertical reactor and reduced in a fixed bed under hydrogen at 450° C. for 2 hours, and then cooled under nitrogen.

The reactor is then transferred into a glove box that is filled with nitrogen, and its contents are emptied into a Dewar flask. The latter is then taken out of the box and therefore abruptly exposed to air. The internal temperature of the catalyst is tracked with a thermocouple: the latter rises abruptly to 175° C.

EXAMPLE 6

The same methodology as in the preceding example is used, except that the catalyst will be coated after reduction in the following way: in the glove box under nitrogen, the contents of the reactor (with the catalyst reduced to 450° C. under hydrogen) are emptied into a steel barrel and heated to 60° C. with an infrared lamp. A solution with 20% by weight of acrylic polymer type resin in ethyl acetate is vaporized on the solid in rotation in such a way as to deposit 10% resin. For drying, the product is allowed to rotate for one hour, then cooled for one hour and subjected to the DEWAR test as in the preceding example. The internal temperature during re-exposure to air goes from 27 to 35° C., which proves that the oxidation reaction was extremely limited owing to the protective polymer layer slowing down the diffusion of oxygen.

The preceding examples can be repeated with similar success by substituting the generically or specifically described reactants and/or operating conditions of this invention for those used in the preceding examples.

The entire disclosure of all applications, patents and publications, cited above, and of corresponding French application No. 97/10.361 and U.S. Provisional application No. 60/061,459, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process comprising:
   a) providing an inert coating material capable of functioning as a protective layer against oxygen and water and also being removable during refining or a hydrocarbon conversion reaction;
   b) applying said coating material on heterogeneous porous hydrocarbon conversion catalyst particles, said catalyst comprising a support and a pair of catalyst metals selected from the group consisting of CoMo, NiMo and NiW under conditions wherein the coating material is present in a quantity corresponding to less than about half of the catalyst pore volume;
   c) wherein said coating material is
      1. atomized or dispersed on the catalyst by continuously stirring the catalyst and keeping it at a temperature that is below the crystallization point of the coating material, or
      2. a solution that contains the material is atomized, sprayed or dispersed by continuously stirring the catalyst at a temperature that is above the boiling point of the solvent of said solution; and
   d) wherein the coating on the particle exhibits a concentration gradient which decreases from the periphery of the particle towards the center of the particle.

2. A process according to claim 1, further comprising eliminating the inert coating material in a reaction zone under the conditions of a refining or hydroconversion reaction.

3. A process according to claim 1, the inert coating material is a natural or synthetic petroleum.

4. A process according to claim 3, wherein the coating material is selected from the group consisting of paraffins, waxes, heavy hydrocarbons, lubricating bases, light polymers, resins, acrylic esters; polyvinyl acetate, copolymers.

5. A process according to claim 1, wherein the inert coating material is a vegetable or animal fat, or a sugar or polysaccharide, used alone or in combination, or diluted in a solvent.

6. A process according to claim 1, wherein inert coating material is in the form of a dilute solution or suspension in a solvent, the inert coating material having a molecular size larger than 10 nm.

7. A passivated catalyst produced according to the process of claim 1.

8. A process according to claim 6, wherein the molecular size is larger than 100 nm.

9. A process according to claim 1, wherein the coating material is polyethylene wax.

10. A process according to claim 1, wherein the coating material is in the form of a solution of an acrylic polymer in ethyl acetate and the coating is applied by spraying the solution onto the catalyst under conditions wherein the solvent is essentially completely vaporized prior to reaching the particles of catalysts.

11. A process according to claim 1, wherein the inert coating material is a polyethylene wax.

12. A process according to claim 1, wherein the inert coating material is an oil and said oil is applied by spraying under an inert atmosphere.

13. A process according to claim 1, wherein the support is alumina.

14. A process according to claim 1, wherein the coating material is in the form of a compound selected from the group consisting of solution of an acrylic polymer in ethyl acetate, a polyethylene wax, and an oil applied by spraying under an inert atmosphere.

15. A process comprising:
    a) providing an inert coating material capable of functioning as a protective layer against oxygen and water and also being removable during refining or a hydrocarbon conversion reaction;
    b) applying said coating material on heterogeneous porous hydrocarbon conversion catalyst particles, said catalyst comprising a support and a pair of catalyst metals selected from the group consisting of CoMo, NiMo and NiW under conditions wherein the coating material is present in a quantity corresponding to less than 30% by weight relative to the catalyst;
    c) wherein said coating material is
       1. atomized or dispersed on the catalyst by continuously stirring the catalyst and keeping it at a temperature that is below the crystallization point of the coating material, or
       2. a solution that contains the material is atomized, sprayed or dispersed by continuously stirring the catalyst at a temperature that is above the boiling point of the solvent of said solution; and
    d) wherein the coating on the particle exhibits a concentration gradient which decreases from the periphery of the particle towards the center of the particle.

16. A process according to claim 15, wherein a coating material is applied to the catalyst particles at a quantity corresponding to less than 25% by weight relative to the catalyst.

17. A process according to claim 1, wherein said coating material is a paraffin and is applied by heating the catalyst at a temperature below the crystallization of the paraffin and then atomizing the paraffin onto the catalyst whereby the paraffin crystallizes upon contact with the catalyst.

18. A process according to claim 1, wherein said coating material is a polyethylene wax and is applied by heating the catalyst at a temperature below the crystallization of the polyethylene wax and then atomizing the polyethylene wax onto the catalyst whereby the polyethylene wax crystallizes upon contact with the catalyst.

19. A process according to claim 1, wherein said coating material is a liquid heavy hydrocarbon which is applied by atomization whereby the temperature of the catalyst causes the viscosity of the liquid heavy hydrocarbon to increase thereby slowing transport of the coating material into the core of the catalyst.

20. A process according to claim 1, wherein the coating material is applied by diluting or suspending the coating material in a solvent to form a solution or a suspension, applying the resultant solution or suspension onto the catalyst by atomization, spraying or dispersion at a temperature greater than the boiling point of the solvent, whereby the solvent is eliminated by vaporization upon contact with the catalyst.

21. A process according to claim 9 wherein the polyethylene wax is atomized onto the catalyst.

* * * * *

UNITED STATES PATENT AND TRADEMARK OFFICE
CERTIFICATE OF CORRECTION

PATENT NO.    : 6,294,498 B1
DATED         : September 25, 2001
INVENTOR(S)   : Nilanjan Brahma It is certified that error appears in the above-identified patent and that said Letters Patent is hereby corrected as shown below:

Title page,
Item [75], Inventors, reads "Les Bains;" should read -- Saint Georges Les Bains; -- therefor, reads "Lyons;" should read -- Lyon; --

Column 9,
Line 36, reads "claim 1, the inert" should read -- claim 1, wherein the inert --
Line 38, reads, "wherein the coating" should read -- wherein the inert coating --
Line 41, reads "esters; polyvinyl" should read -- esters and polyvinyl --

Signed and Sealed this

Twenty-first Day of June, 2005

JON W. DUDAS
*Director of the United States Patent and Trademark Office*